Nov. 8, 1927.                                                    1,648,057
H. PARKER
CONDUIT JOINT AND METHOD OF MAKING THE SAME
Filed Oct. 23, 1925
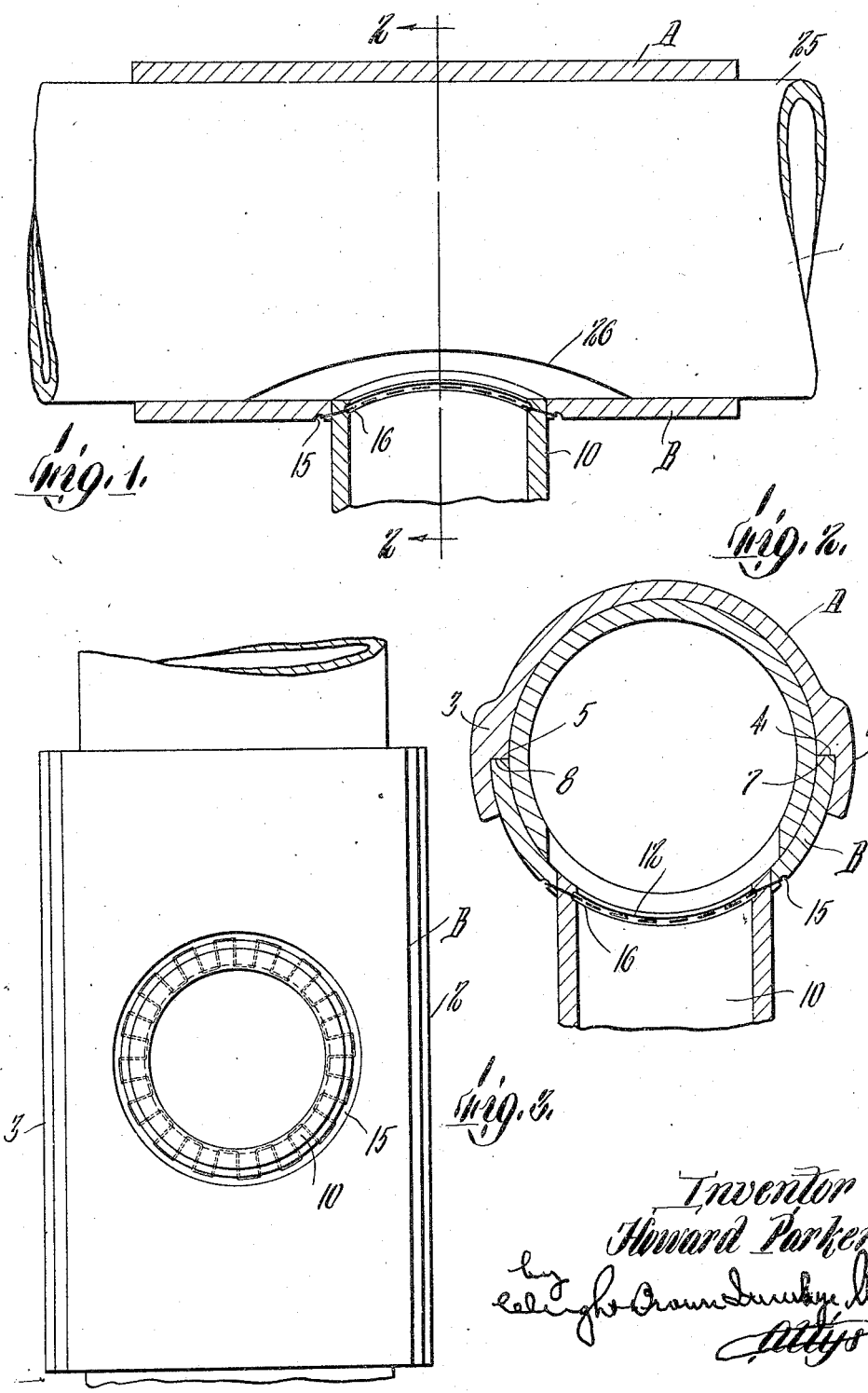
Inventor
Howard Parker Patented Nov. 8, 1927.

1,648,057

UNITED STATES PATENT OFFICE.

HOWARD PARKER, OF BERLIN, NEW HAMPSHIRE, ASSIGNOR TO BROWN COMPANY, OF BERLIN, NEW HAMPSHIRE, A CORPORATION OF MAINE.

CONDUIT JOINT AND METHOD OF MAKING THE SAME.

Application filed October 23, 1925. Serial No. 64,400.

The present invention relates to conduit connections and is more particularly concerned with connections effected between conduits or conduit parts composed of fibrous material.

Such conduits or tubes may be formed by winding a web of cellulose pulp or a sheet of wet paper on a mandrel until a tube having a wall of the desired thickness has been built up, then removing the tube from the mandrel and thoroughly drying it. When employed as a conduit in an electric wiring system or as a pipe, the tubes may be waterproofed and rendered electro-insulating by impregnation or saturation with pitch or other suitable material. As a result of such waterproofing treatment, the strength and rigidity of the tubes are increased and they may be shaped or formed by cutting tools while being turned on a lathe, and the formed or cut surfaces ground to a smooth finish.

Since these conduits or tubes as commercially produced are made in standard sizes and have relatively thin walls, it is difficult to produce a tight or permanent joint between intersecting conduits or conduit parts, by any of the usual methods, as by threading the parts or forming them with a drive joint.

Consequently, the present invention has for its object to provide a method of forming a tight, permanent joint between intersecting conduits or conduit parts.

Briefly stated, the method of the present invention consists in stitching the conduit or conduit parts together. The stitching operation is carried out on "green" stock (that is, stock which has not yet undergone impregnation with waterproofing material), after which the stock is impregnated or saturated, as ordinarily, with a waterproofing compound.

The invention will be described as applied to intersecting conduit parts, viz: as applied to certain types of branch connectors which may be joined on to any portion of an underground conduit system without necessitating the removal or disconnection of any conduit unit from the system. Such connectors are disclosed and claimed in my application, Serial No. 43,601, filed July 14, 1925.

The connector, which I have termed, for convenience of designation, a "snap joint connector," consists in general of two complemental or mating semi-tubular sections, either or both of which may be provided with intersecting tubular branch pieces or conduits. These sections are adapted to be united to form a unit tubular connector.

With the foregoing and other features in view, a more complete understanding of the invention may be gained from the following detailed description thereof, when taken in conjunction with the accompanying drawings, in which Figure 1 illustrates in section a stitched joint formed between the branch piece and a tubular section of a branch connector.

Figure 2 represents a section on the line 2—2 of Figure 1.

Figure 3 shows in front elevation the stitched joint.

Referring to the drawings, the branch connector to which the stitched or sewed joint is applied for the purpose of illustration, consists, as previously stated, of two semi-tubular sections. The section A consists of a semi-tubular wall 1, having wall extension members 2 and 3 of cylindrical curvature, forming with the longitudinal edges of the section, respectively, the ledges or seats 4 and 5. The members 2 and 3 are of an inside diameter sufficient to take over or embrace a portion of the wall of the semi-tubular section B, to the side edges 7 and 8 of which the ledges 4 and 5 of the section A are complemental. The longitudinal edges of the extension members are separated a sufficient distance to permit them to be sprung or flexed apart and snapped over the section B without being permanently deformed or cracked. Consequently, when the two sections are snapped together, the extension members exert a spring action to force the two sections tightly together and to ensure their union without necessitating any additional clamping or uniting means. This action afforded by the tubes is due to the inherent springiness or semi-resiliency of the material of which they are constructed.

Either or both sections may be provided with openings in which a branch piece or conduit may be inserted. For example, a hole 12 may be suitably formed in the section B, in which a fibrous conduit piece 10 may be inserted and stitched to the wall of the section.

As previously indicated, the stitching is carried out on green stock, that is, stock which has not been hardened or rigidified by treatment with waterproofing compound. In order to bring the stitching under the surface, a groove 15 is preferably first formed by any suitable cutting tool, in the section B, immediately around the hole 12, and a corresponding groove 16 in the interior of the branch conduit 10 directly adjacent to or bordering the wall of the section B in which it is inserted. The piece 10 is then united to the section by stitching them together with any suitable strand material, such as wire, which is passed or threaded alternately through the material of both parts until the stitching has entirely encircled the grooves.

Where the stitching operation is manually effected, holes are first drilled through the material and the wire passed alternately through the material of both parts, from the groove 15 to the groove 16 until the grooves have been entirely encircled. Any other suitable strand material may be employed in place of the wire, and the stitching operation may be carried out with any suitable stitching machine or instrumentality, if desired.

After the stitching has been completed, the green stock in which the sewed joint is included is then subjected to impregnation or treatment with pitch or other suitable waterproofing material. The impregnating material hides or embeds the sewed joint and completely fills the stitching holes so that the finished joint is waterproof and presents the same appearance as other parts of the material. A joint thus produced is tight and permanent, the waterproofing material hiding the sewing strand from exposure to the elements and thus preventing the joint from deteriorating.

In joining a branch connection of the type described to a main conduit in an underground system, the main conduit 25 is first broken into at the point in the conduit at which the branch connection is to be established, and the desired size of opening 26 is made therein. The branch connector employed is of an outside diameter equal to the diameter of the main conduit in connection with which it is to be used. In making the connection, the semi-tubular section A of the connector is applied to or forced over the wall of the main conduit diametrically opposite to the hole 26 formed therein. The other semi-tubular section B, with the branch piece 15 sewed securely thereto as hereinbefore described, is snapped into position, its edges 7 and 8 resting on the seats 4 and 5 of the mating section A, with the extension members 2 and 3 engaging or embracing a portion of its outer surface in a manner to maintain a tight union or joint therebetween. Preferably, asphalt, cement, or any other suitable binder is applied between the main conduit and the sections, and entirely around the sections, if desired.

As previously adverted to, the tubes and connectors are formed of successive layers or convolutions of interfelted fibrous material, sufficiently matted together or interlocked to form a practically solid or homogeneous wall. The waterproofing compound imparts sufficient strength, hardness and rigidity to the tubes to permit them to be subjected to cutting operations. The sections A and B, for example, may be formed from transverse tube sections, suitably cut and machined to form.

While I have described a sewed joint construction as applied specifically to a preferred type of snap joint connector, I desire to have it clearly understood that such sewed joints may be employed in other suitable types of branch connectors, such, for example, as any one of the snap types fully set forth in my application, Serial No. 43,601, filed July 14, 1925; or such a sewed joint may be employed where a branch conduit or other conduit part is joined to or directly intersects a main conduit. In any case, the branch connection or other conduit part should be sewed to the main conduit while both are still in a green condition, after which they are impregnated with waterproofing compound, as previously indicated.

In the appended claims, by the term "conduit" I may mean a conduit of full length as produced on the conduit machine, or a conduit section which may be formed by cutting a conduit as produced on the machine longitudinally or transversely, or any other parts, such as elbows, which are formed from cylindrical conduits or tubes initially produced on a conduit-forming machine.

Having thus described my invention, it is evident that various changes and modifications might be resorted to without departing from the spirit or scope of invention; hence I do not wish to limit myself strictly to the specific structure herein set forth.

What I claim is:

1. A method of making rigid waterproof conduit connectors composed of fibrous material, which comprises sewing two rigid fibrous conduit members together in the desired relationship and impregnating the whole structure with waterproofing material.

2. A method of making intersecting rigid waterproof conduit branch connectors composed of fibrous material, which comprises sewing the end portion of one piece of conduit to the wall of the other conduit which it intersects, and impregnating the structure with waterproofing material.

3. A method of uniting intersecting rigid conduits composed of fibrous material, which comprises sewing the end portion of the intersecting conduit to the wall of the conduit which it intersects, and then impregnating the whole structure with waterproofing material.

4. A method of uniting intersecting rigid fibrous conduits, the intersected conduit having a hole formed therein for the reception of the intersecting conduit, which comprises cutting a groove immediately around the hole, cutting a groove in the interior of the intersecting conduit at the end which is to be attached, inserting said end in said hole, and stitching the conduits together with strand material passed alternately through the material of both conduits from groove to groove.

5. A method of uniting intersecting rigid fibrous conduits, the intersected conduit having a hole formed therein for the reception of the intersecting conduit, which comprises cutting a groove immediately around the hole, cutting a groove in the interior of the intersecting conduit at the end which is to be attached, inserting said end in said hole, stitching the conduits together with strand material passed alternately through the material of both parts from groove to groove, and then impregnating the whole structure with waterproofing material.

6. Intersecting rigid conduits composed of fibrous material, the end of the intersecting conduit being sewed to the wall of the intersected conduit.

7. Intersecting conduits composed of fibrous material, a sewed seam connecting the end of the intersecting conduit to the wall of the intersected conduit, and a waterproofing compound saturating and coating the entire structure and encasing said stitching.

8. Intersecting conduits composed of fibrous material, the end portion of the intersecting conduit having a groove formed interiorly therein and the intersected conduit having a hole receiving the end of the intersecting conduit and a groove formed around said hole, and strand material passed alternately from groove to groove through the fibrous material of both parts.

9. Intersecting conduits composed of fibrous material, the end portion of the intersecting conduit having a groove formed interiorly therein and the intersected conduit having a hole receiving the end of the intersecting conduit and a groove formed around said hole, strand material passed alternately from groove to groove through the fibrous material of both parts, and a waterproofing compound saturating and coating the entire structure and encasing said stitching.

In testimony whereof I have affixed my signature.

HOWARD PARKER.